United States Patent [19]

Sasaki

[11] Patent Number: 4,571,270

[45] Date of Patent: Feb. 18, 1986

[54] PROCESS AND AUTOCLAVE FOR DEWAXING MOLD FOR LOST WAX CASTING

[75] Inventor: Nobuyoshi Sasaki, Yokohama, Japan

[73] Assignee: M.C.L. Co., Ltd., Kanagawa, Japan

[21] Appl. No.: 603,108

[22] Filed: Apr. 23, 1984

[30] Foreign Application Priority Data

Apr. 27, 1983 [JP] Japan .................. 58-72974

[51] Int. Cl.[4] .................... B08B 3/00
[52] U.S. Cl. ....................... 134/5; 34/37; 34/216; 134/19; 134/40; 134/153; 134/157; 134/200
[58] Field of Search ............ 34/37, 216; 134/5, 22.1, 134/23, 40, 147, 148, 153, 157, 200, 201, 19; 422/208, 209, 242; 432/230

[56] References Cited

U.S. PATENT DOCUMENTS

| | | | |
|---|---|---|---|
| 1,596,214 | 8/1926 | O'Brien | 134/5 |
| 3,071,178 | 1/1963 | Howeth | 134/200 |
| 3,744,402 | 7/1973 | Piegza et al. | 134/153 |
| 4,018,239 | 4/1977 | Caldwell et al. | 134/200 |
| 4,104,080 | 8/1978 | Sadwith | 134/23 |
| 4,204,872 | 5/1980 | Hayati et al. | 106/38.3 |

FOREIGN PATENT DOCUMENTS 950424  8/1982  U.S.S.R. .................. 422/242

*Primary Examiner*—Peter Hruskoci
*Attorney, Agent, or Firm*—Laff, Whitesel, Conte & Saret

[57] ABSTRACT

A process for dewaxing a mold for use in lost wax casting is proposed, wherein the mold is loaded on a pallet which is placed and then securely held on a carrier which is rotatably assembled in a dewaxing tank. The mold is inverted to be ready for dewaxing within the tank and then returned to the initial condition within the tank by rotating the carrier by about 180 degrees at a time.

An autoclave for use in the process comprises a carrier framework rotatably disposed within a dewaxing tank for carrying a pallet loaded with shell mold trees. The carrier framework is held in a first position for assembling the pallet and then is rotated by about 180 degrees to a second inverted position to hold the pallet securely in the inverted condition during the dewaxing operation.

A preferred embodiment of the autoclave further comprises means for securely fastening the pallet and the mold trees automatically and simultaneously with the operation of sealingly closing the entrance opening of the dewaxing tank.

4 Claims, 7 Drawing Figures

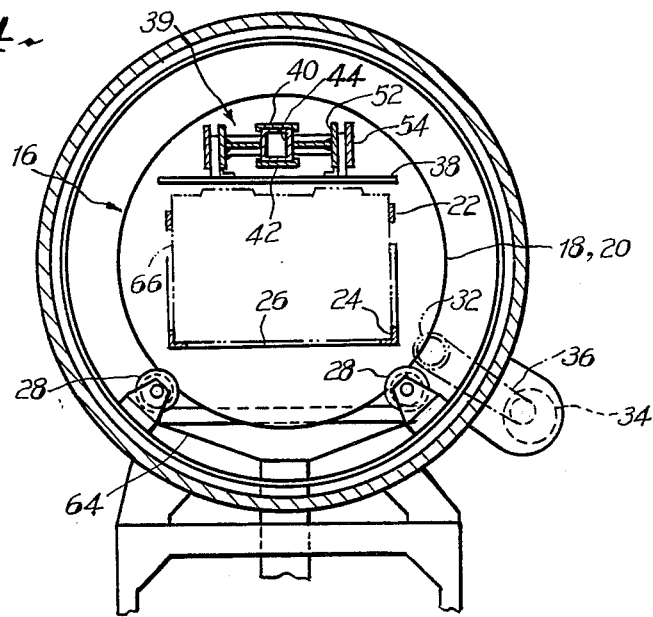
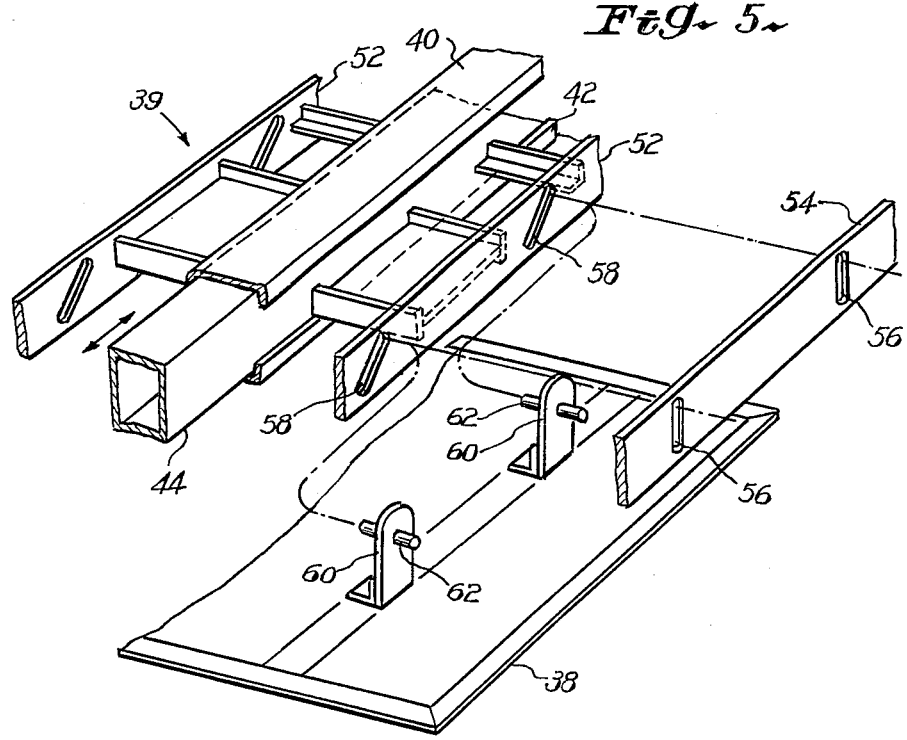

PROCESS AND AUTOCLAVE FOR DEWAXING MOLD FOR LOST WAX CASTING

BACKGROUND OF THE INVENTION

1. Field of Art

The present invention relates generally to the preparation of molds used in a so-called lost wax casting process, and particularly to a process and apparatus for dewaxing ceramic shell molds by use of a superheated high temperature steam to melt and remove the wax from the molds prepared by coating a slurry and stucco particles over the wax masters.

2. Prior Art

In the lost wax casting process, it is a common practice to use an autoclave for melting the wax contained in the green ceramic shell molds formed by coating a slurry and stucco particles to allow the molten wax to leave the molds. In the conventional dewaxing step, a shell mold tree is put into a dewaxing tank of the autoclave with the sprue port thereof facing downwardly, followed by a rapid heating by means of superheated steam. However, in the preceding steps, the shell mold tree is held in the condition that the sprue rod protruding through the sprue port extends upwardly. In detail, in the coating step, the wax master tree is suspended from the sprue rod and subjected to repeated dippings into the slurry and stucco reservoirs followed by drying. Then, prior to introducing the dried shell mold tree into the dewaxing tank, the tree must be inverted to allow the molten wax to flow out of the mold cavities.

After the completion of the dewaxing operation, the dewaxed shell mold tree should be again inverted to be held in the initial condition at which the sprue rod protruding through the sprue port extends upwardly, in order to effect a complete combustion of the remaining wax at the subsequent step of sintering the stucco particles to form the finished ceramic shell molds.

By the use of the conventional autoclave for dewaxing, the green wax master trees must be inverted upside down by hand before they are introduced into the autoclave, and they must be again inverted to the initial or normal condition after they are dewaxed to be ready for subjecting them to the subsequent sintering step. These repeated inversion operations have hitherto been carried out manually to lower the operation efficiency. Manual operations also result in an increase of production cost.

OBJECTS AND SUMMARY OF THE INVENTION

An object of this invention is to provide a process wherein a mold to be dewaxed is carried by a carrier assembled in a dewaxing tank, and inverted by about 180 degrees to be ready for dewaxing and then returned to the initial condition by another 180 degree rotation within the tank after the completion of dewaxing.

Another object of this invention is to provide an autoclave equipped with automatic inverting means to eliminate the need for troublesome manual handling operations which require a great deal of labor.

A further object of this invention is to provide such a labor-saving autoclave to improve the operation efficiency of the dewaxing step.

An even further object of this invention is to provide such an autoclave comprising a carrier framework which is rotatably disposed within the dewaxing tank for carrying a pallet loaded with a plurality of shell mold trees.

An additional object of this invention is to provide such an autoclave further comprising means for securely holding the pallet and the mold trees automatically and simultaneously with the operation of sealingly closing the entrance opening of the dewaxing tank. By the provision of automatically securing or fastening means, the operation efficiency can be further improved and the reliability is assured.

In order to attain the object of the invention, the present invention provides a process for dewaxing a mold for use in a lost wax casting, the process comprising the steps of loading the mold on a pallet, placing the pallet on a carrier which is rotatably assembled in a dewaxing tank, holding the pallet securely by the carrier, rotating the carrier by about 180 degrees to invert the mold upside down, charging superheated steam in the dewaxing tank to melt the wax after the dewaxing tank is closed, rotating said carrier by about 180 degrees to return said carrier to the initial condition, opening the dewaxing tank to remove the mold therefrom.

The another object of this invention provides an autoclave for dewaxing molds for lost wax casting, comprising a dewaxing tank for containing high temperature steam, a carrier framework disposed within said dewaxing tank to be rotated about a substantially horizontal axis by at least 180 degrees from a first position to a second inverted position, and a pallet for carrying thereon the molds, the pallet being assembled with and disassembled from the carrier framework when the latter is in the first position, and the carrier framework being rotated to the second inverted position while holding the pallet in the inverted condition during the dewaxing operation.

In a preferred embodiment, the carrier framework comprises a pair of opposing wheels rotatably supported by bearing means, drive means for rotating said pair of opposing wheels, guide rails extending between the opposing wheels for guiding and holding the pallet, and a perforated cover plate for securing the molds, the perforated cover plate being moved between an upper retracted position and a lower fastening position.

In a further preferred embodiment, cooperative means are provided to move the perforated cover plate from the retracted position to the fastening position simultaneously with the operation of sealingly closing the dewaxing tank.

DESCRIPTION OF THE DRAWINGS

A more detailed understanding of the invention may be had from the following description of a preferred embodiment to be studied in conjunction with the accompanying drawings, in which:

FIG. 4 is a sectional view taken along line IV—IV of FIG. 3;

FIG. 5 is a schematic illustration showing the cooperative means for moving the perforated cover plate between the retracted and fastening positions.

DESCRIPTION OF PREFERRED EMBODIMENT

Figure 1:
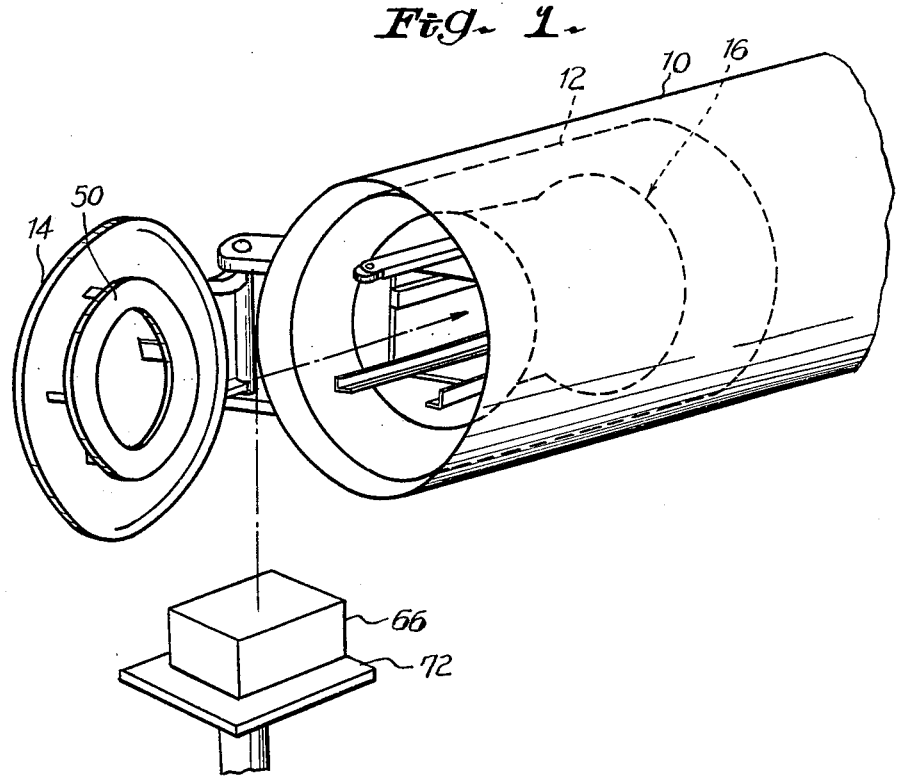
FIG. 1 is a perspective view, with a portion cut away, of an autoclave according to the invention, wherein the pallet is shown as being supported by external support means.

The autoclave illustrated in the drawings, by way of example, comprises an external tank 10 generally designated by reference numeral 10. The external tank 10 is made of a cylinder having one end closed and the other end opened. Another smaller cylinder having a length shorter than the length of the external tank 10 and having one end closed is inserted in the external tank 10 to be used as a dewaxing tank 12. The opening edge of the external tank 10 is sealingly connected, by welding or other suitable means, to the opening edge of the dewaxing tank 10 through an annular brim or flange, so that only the interior chamber defined by the dewaxing tank 12 may be opened to the atmosphere when a sealing lid 14 is opened.

Figure 2:
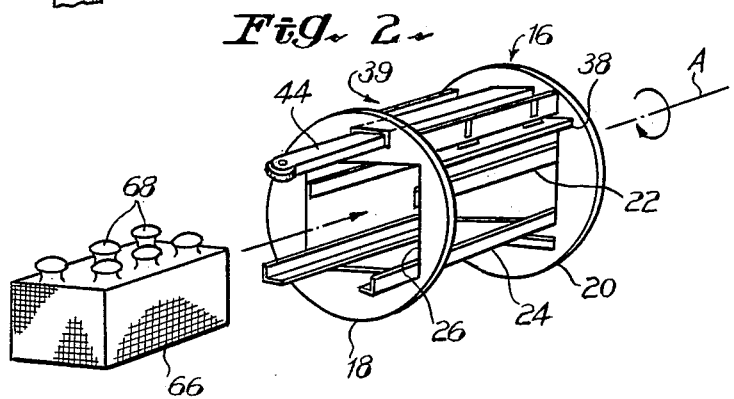
FIG. 2 is a schematic illustration showing the pallet and the carrier framework of the autoclave shown in FIG. 1.
Figure 3:
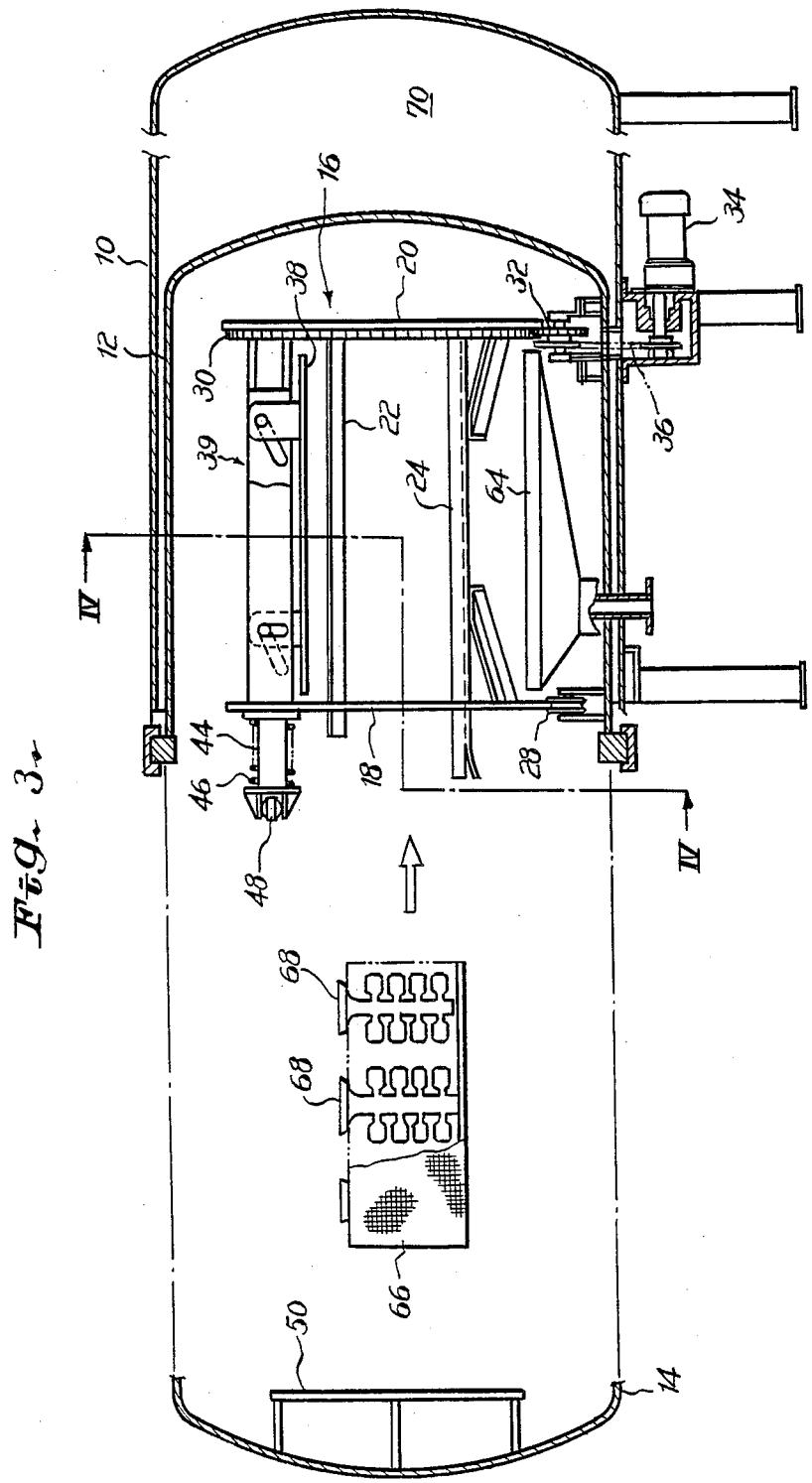
FIG. 3 is a vertical sectional view showing the dewaxing tank and the pallet loaded with a plurality of mold trees as having been just assembled with the carrier framework.
Figure 6:
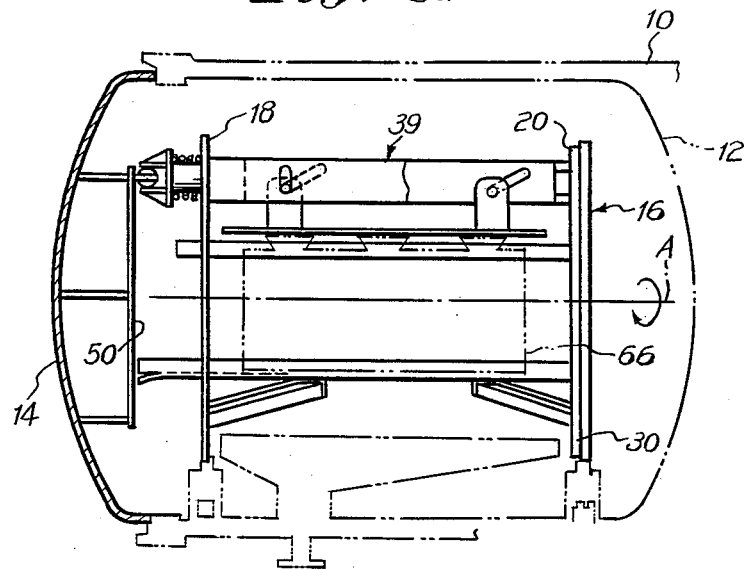
FIGS. 6 and 7 are views showing the operation of the cooperative means shown in FIG. 5.

A carrier framework 16 is disposed within the dewaxing tank 12 and may be rotated about a substantially horizontal axis A as will be described in detail hereinafter with reference to FIGS. 2 and 6. The carrier framework 16 comprises a pair of opposing wheels 18 and 20, upper and lower rails 22 and 24 extending between the opposing wheels 18 and 20. The wheel 18 has a rectangular opening 26 through which the rails 22 and 24 project toward the entrance opening of the tank 12 to facilitate easy insertion and withdrawal of the pallet 66, as will be described in detail hereinafter. The carrier framework 16 is rotatably carried in the dewaxing tank 12 by means of four rollers 28 which bear the wheels 18 and 20. A circumferential gear 30 is fixed to the wheel 20, as best shown in FIG. 3, and meshes with a small gear 32 which is driven through a chain 36 by a motor 34. The motor 34 is mounted on the exterior wall of the external tank 10 and provided with a reduction gear.

A cover plate 38 is assembled in the upper portion of the carrier framework 16. The cover plate 38 is perforated to have a number of through-holes and is moved from an upper or retracted position to a lower or fastening position, at which it securely holds the pallet 66 and molds 68, by means of a cooperative device 39 which is provided to move the cover plate 38 from the upper retracted position to the lower fastening position in response to the opening and closing operation of the sealing lid 14.

Now referring to FIG. 5, a push rod 44 projecting from the wheel 18 is slidingly inserted in-between upper and lower guide tracks 40 and 42 each having the ends welded or otherwise fixed to the wheels 18 and 20. The push rod 44 is biased by a cool spring 46 toward the sealing lid 14. The end of the push rod 44 facing to the sealing lid 14 is attached with a roller bearing 48 which engages with a ring 50 attached on the inside face of the sealing lid 14 as the lid 14 is closed. Whereupon the push rod 44 is moved against the biasing force of the coil spring 46 in the right-hand direction, as viewed in FIG. 3, to the push-in position. Slider plates 52, 52 are mounted to the push rod 44 through a plurality of arms. Fixed crossbeams 54, 54 extend between the wheels 18 and 20 in the face-to-face relationship with the slider plates 52, 52. Each crossbeam 54 is provided with two substantially vertical slots 56, whereas each slider plate 52 is provided with two inclined guide slots 58. Brackets 60, provided with pins 62, are fixed on the upper face of the cover plate 38 to extend upwardly so that each pin 62 is received in the corresponding slots 56 and 58.

When the sealing lid 14 is opened, the push rod 44 is moved outwardly to the position shown in FIG. 3 and the pins 62 guided by the inclined slots 58 are raised upward along the vertical slots 56 of the fixed crossbeams 54, whereby the cover plate 38 is moved upwardly to the retracted position. On the other hand, as the sealing lid 14 is closed, the roller bearing 58 is engaged by the ring 50 so that the push rod 44 is moved inwardly in the right-hand direction, as viewed in FIG. 3, whereby the cover plate 38 is moved to the lower fastening position as shown in FIG. 6.

A funnel 64 for receiving the molten wax is disposed below the carrier framework 16, and has a stem communicating with an external wax reservoir (not shown) through a valve (not shown). The wax received by the funnel 64 is, thus, recovered and contained in the wax reservoir for reuse.

Reference numeral 66 designates the pallet which has a box-like contour and the dimensions adapted to be placed within the space defined by the carrier framework 16 while being guided by the rails 22 and 24 to pass through the opening 26 of the wheel 18. A number of small pores is formed through each wall of the box or pallet 66 to allow steam to pass freely therethrough. Reference numeral 68 designates mold trees which are prepared by coating a slurry and stucco particles repeatedly over the wax masters clustered on respective sprue rods followed by drying. A plurality of mold trees 68, six in the illustrated example, are put on the pallet 66 with their sprue ports facing upwardly. The upper portion of each mold tree 68 projects beyond the side walls of the pallet 66.

Figure 7:
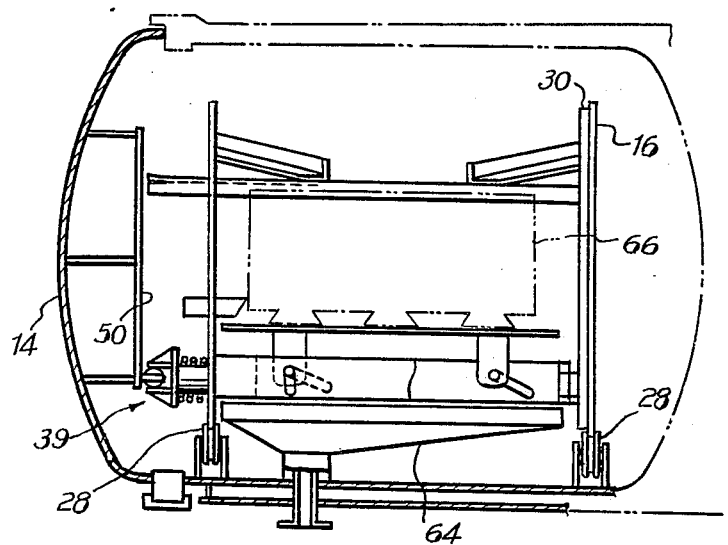

The operation of the illustrated embodiment of the invention will now be described. High temperature steam generated by a not-shown steam generator is temporarily contained in the space enclosed by the external tank 10 and the dewaxing tank 12, namely in a steam stock chamber 70. The lid 14 is opened, as shown in FIG. 1, and the pallet 66 carrying the mold trees 68 is raised by a lift 72 to a position in front of the dewaxing tank 12 and then inserted into the space surrounded by the carrier framework 16 within the tank 12 by a not-shown conveyer system while being guided by the rails 22 and 24. After removing the empty lift 72, the lid 14 is closed. Whereupon the push rod 44 is moved inwardly by the ring 50 attached on the internal face of the lid 14 to lower the cover plate 38 to the fastening position. The top face of each mold tree 68 is pressed by the cover plate 38 under proper pressure to be securely held in situ during the subsequent operations. Then, the motor 34 is actuated to drive the small gear 32 which in turn drives the circumferential gear 30 to rotate a wheel 20. As the result, the carrier framework 16 is rotated together with the loaded pallet 66 and mold trees 68. The roller bearing 48 at the end of the push rod 44 rolls along the ring 50. The motor 34 is deenergized at the timing when the carrier framework 16 is rotated by about 180 degrees. The timing of deenergization of motor 34 may be determined by detecting the number of revolutions undertaken by the motor 34. The mold trees 68 are now inverted with their sprue ports facing downward, as shown in FIG. 7. Steam stocked in the steam stock chamber 70 and additionally supplied from the steam generator is then injected into the dewaxing tank 12 to heat the mold trees 68 rapidly. By such rapid heating, the wax contacting the interior surfaces of the molds is rapidly melted before the entire volume of each wax master contained in the shell mold trees 68 is thermally expanded, and the molten wax flows out of the molds for a short period of time without a fear that the coating layers are broken by the influence of thermal expansion. The molten wax flowing out of the molds is collected by a funnel 64 to be discharged from the tank 12 and stocked for reuse.

After the completion of dewaxing operation, the motor 34 is again actuated to rotate the carrier framework 16 by about 180 degrees to return the carrier framework 16 to the initial position at which the sprue ports of a the mold trees 68 face upwardly. Steam in the dewaxing tank 12 is purged, and then the lid 14 is opened. The push rod 44 is moved outwardly by the action of the biasing spring 46 to raise the cover plate 38 to the upper retracted position. After raising the lift 72 to the position facing to the entrance opening of the dewaxing tank 12, the pallet 66 is delivered to the lift 72 by a not-shown conveyer system. The lift 72 is then lowered and the pallet 66 is conveyed to the subsequent sintering system.

By the provision of cooperative device 39 which is operatively associated with the sealing lid 14 to raise and lower the cover plate 38 in response to the opening and closing operations of the lid 14, the pallet 66 and the mold trees 68 are securely held within the carrier framework 16 automatically to improve the operation efficiency and to save the labor and cost. Automation of lost wax casting process may be realized by the incorporation of the autoclave described in the foregoing description. The cooperative device 39 illustrated in the embodiment is a kind of cam mechanism including the inclined guide slots 58 serving as cam faces and the pins 62 serving as cam followers. However, other types of cooperative device may be adopted, the examples being a link mechanism and a solenoid plunger operatively associated with the lid 14 to be actuated simultaneously with the opening and closing operations of the lid 14. It is intended to embrace all such modifications and alternations within the scope of the invention as far as they are included within the broad extension defined by the appended claims.

What is claimed is:

1. A process for dewaxing a mold for use in lost wax casting, comprising the steps of securely loading said mold on a pallet, placing said pallet on a carrier rotatably assembled in a dewaxing tank, securely holding said pallet and said mold on said carrier while within said dewaxing tank by means operative responsive to a closing of a door on said dewaxing tank, rotating said carrier by about 180 degrees to invert said mold to an upside down position, charging superheated steam into said dewaxing tank to melt the wax after said dewaxing tank is closed, rotating said carrier by about 180 degrees to return said carrier to the initial condition, and releasing said pallet and said mold from said carrier responsive to an opening of said door to remove said mold from said dewaxing tank.

2. An autoclave for dewaxing a mold used for lost wax casting, comprising a dewaxing tank for containing high temperature steam, said tank having a door sealingly closing said tank, a carrier framework disposed within said dewaxing tank to be rotated about a substantially horizontal axis by at least about 180 degrees from a first position to a second inverted position, and a pallet for carrying thereon said mold, said carrier framework comprising a pair of opposing wheels rotatably supported by bearing means, drive means for rotating said pair of opposing wheels, guide rails extending between said opposing wheels for guiding and holding said pallet, and a perforated cover plate for fastening said mold to said pallet, a cooperative means operative responsive to closing and opening said door for securing said pallet and mold while in said tank and for releasing said pallet and mold for removal from said tank, and means for injecting superheated steam into said dewaxing tank, said pallet being assembled with and disassembled from said carrier framework when the latter is in said first position, and said carrier framework being arranged to rotate to said second inverted position while holding said pallet securely in the inverted condition during the dewaxing operation.

3. The autoclave according to claim 2, wherein said cooperative means moves said perforated cover plate from an upper retracted position to a lower fastening position simultaneously with the operation of sealingly closing said dewaxing tank.

4. The autoclave according to claim 3, wherein said cooperative means comprises brackets for suspending said perforated cover plate and each having a pin, fixed crossbeams extending between said opposing wheels and each having at least one substantially vertical guide slot for receiving said pin, slider plates each having at least one inclined guide slot for receiving said pin, each pin of said bracket means being guided by said substantially vertical guide slot of said fixed crossbeam and by said inclined guide slot of said slider plate, and a push rod secured to said slider plates and biased by spring means to an extended position under released condition and adapted to be engaged by the closure lid of said dewaxing tank to be moved to a push-in position whereby said pin guided by said slots is moved upwards to raise said perforated cover plate to said upper retracted position.

* * * * *